United States Patent [19]

Reiker

[11] Patent Number: 5,677,512
[45] Date of Patent: Oct. 14, 1997

[54] SELF-ADHERING ELECTRICAL BOX

[76] Inventor: Kenneth H. Reiker, P.O. Box 4106, Shalimar, Fla. 32579

[21] Appl. No.: 490,757

[22] Filed: Jun. 15, 1995

Related U.S. Application Data

[63] Continuation-in-part of Ser. No. 371,695, Jan. 12, 1995.
[51] Int. Cl.$^6$ ........................................ H02G 3/10
[52] U.S. Cl. ..................... 174/58; 220/3.3; 220/3.9; 248/906; 248/205.3
[58] Field of Search ................ 174/48, 58, 53, 174/57; 220/3.2, 3.3, 3.9; 248/906, 205.3

[56] References Cited

U.S. PATENT DOCUMENTS

| | | |
|---|---|---|
| Re. 33,147 | 1/1990 | Reiker . |
| D. 288,289 | 2/1987 | Reiker . |
| 1,133,535 | 3/1915 | Cain et al. . |
| 1,819,460 | 8/1931 | Frank . |
| 2,264,666 | 12/1941 | Hexdall . |
| 2,423,757 | 7/1947 | Dedge . |
| 2,528,418 | 10/1950 | Buckels . |
| 2,809,002 | 10/1957 | Rudolph . |
| 2,917,263 | 12/1959 | Appleton et al. . |
| 2,945,661 | 7/1960 | Appleton . |
| 2,973,175 | 2/1961 | Appleton . |
| 3,097,821 | 7/1963 | Richards . |
| 3,104,087 | 9/1963 | Budnick et al. . |
| 3,214,126 | 10/1965 | Roos . |
| 3,425,655 | 2/1969 | Cogdill . |
| 3,518,421 | 6/1970 | Cogdill . |
| 3,616,096 | 10/1971 | Roeder . |
| 4,050,603 | 9/1977 | Harris et al. . |
| 4,062,512 | 12/1977 | Arnold . |
| 4,140,293 | 2/1979 | Hansen . |
| 4,165,851 | 8/1979 | Bowden, Jr. et al. . |
| 4,275,862 | 6/1981 | Takagi . |
| 4,463,923 | 8/1984 | Reiker . |
| 4,684,092 | 8/1987 | Reiker . |
| 4,880,128 | 11/1989 | Jorgensen et al. . |
| 4,909,405 | 3/1990 | Kerr, Jr. . |
| 5,024,412 | 6/1991 | Hung et al. . |
| 5,044,582 | 9/1991 | Walters . |
| 5,074,515 | 12/1991 | Carter, Jr. . |
| 5,150,868 | 9/1992 | Kaden . |
| 5,234,119 | 8/1993 | Jorgensen et al. . |
| 5,303,894 | 4/1994 | Deschamps et al. . |

Primary Examiner—Kristine L. Kincaid
Assistant Examiner—Dean A. Reichard
Attorney, Agent, or Firm—Shlesinger, Arkwright & Garvey LLP

[57] ABSTRACT

A junction box includes a wall defining a junction box cavity therein. There is an adhesive material provided on the wall for temporarily adhering the junction box to a support. A fastener is provided for permanently attaching the junction box to a support. A method of attaching a junction box to a support includes first temporarily attaching the junction box to a support, and then permanently attaching the junction box to the support.

20 Claims, 3 Drawing Sheets

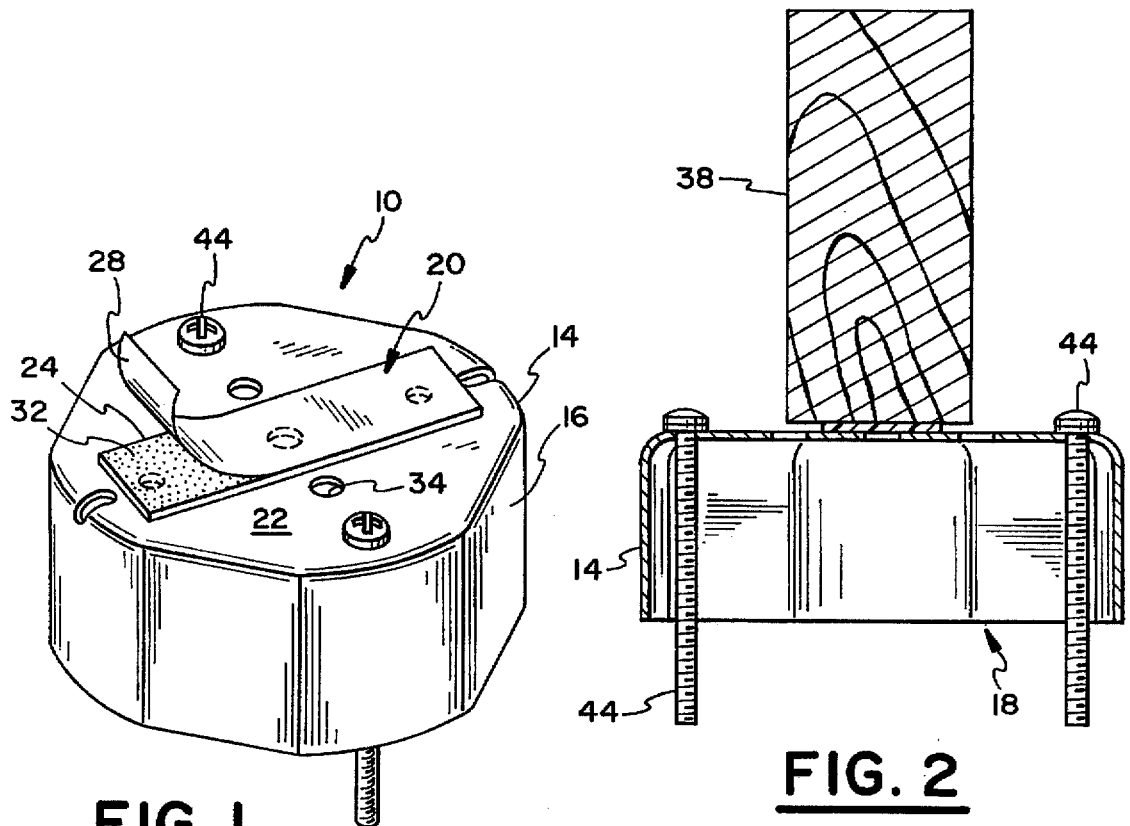
FIG. 1
FIG. 2
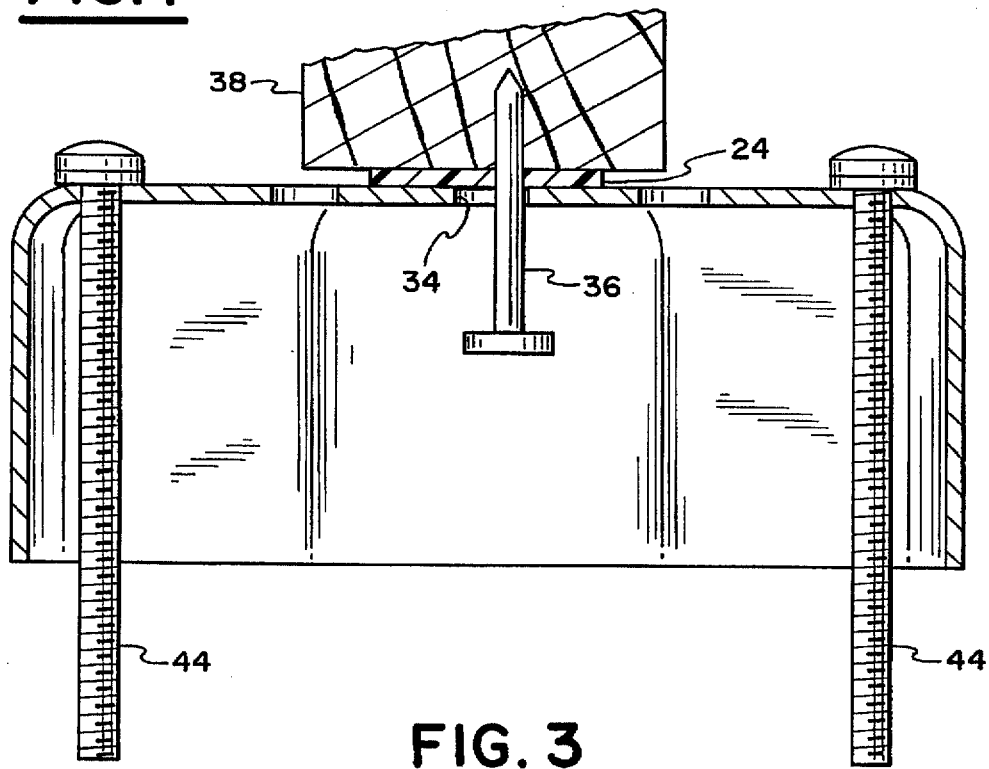
FIG. 3

SELF-ADHERING ELECTRICAL BOX

CROSS-REFERENCE TO RELATED APPLICATIONS

This application is a continuation-in-part of application Ser. No. 08/371,695, filed Jan. 12, 1995, and which is incorporated herein by reference.

This application is related to another application entitled "Self-Attaching Electrical Box" filed concurrently herewith.

FIELD OF THE INVENTION

This invention relates to a mounting assembly; and, in particular, to a self-adhering electrical box for insulation on walls, floors, and ceilings.

BACKGROUND OF THE INVENTION

Conventional electrical boxes exist that can be readily attached to an object, such as a stud in a wall by the use of fasteners.

Typically, conventional electrical boxes or junction boxes are provided with holes through which a fastener is inserted for securing the junction box to a supporting surface.

There even exist junction boxes made of synthetic plastic materials which have two nails or screws attached to the wall of the junction box.

In use, such conventional junction boxes with a pre-attached nail on a side wall thereof, require a user to locate and align the junction box in its correct intended position, and maintain the correct position of the junction box while attempting to hammer the nail or to screw the screw into the support surface.

Thus, such conventional junction boxes, even when provided with pre-attached fasteners, are difficult to install correctly. Experienced tradespeople who can install such conventional junction boxes in the desired location on their first attempt at installation may succeed when the installation is on an easily accessible vertical surface located at a height convenient to the user's hands, and typically at a comfortable height relative to the user's hands and eyes.

Even skilled craftspeople have difficulty installing junction boxes at awkward locations, in overhead installation, and the like.

Still further, junction boxes and electrical fixture mounting boxes are often used to carry relatively large static and dynamic loads, such as chandeliers and ceiling fans, and proper installation of the junction box is necessary.

Examples of known devices include U.S. Pat. No. 5,234,119 to Jorgensen et al.; U.S. Pat. No. 4,880,128 to Jorgensen; U.S. Pat. No. 4,140,293 to Hansen; U.S. Pat. No. 3,097,821 to Richards; U.S. Pat. No. 2,973,175 to Appleton; U.S. Pat. No. 2,423,757 to Dedge; U.S. Pat. No. 2,264,666 to Hexdall; and U.S. Pat. No. 1,819,460 to Frank. Although each of these devices undoubtedly works, there is a need for a junction box which can be more readily manufactured and installed.

Thus, it will be appreciated that there is a need for an electric mounting box which can be used for a variety of applications, and which is easy to manufacture, to install, and to use.

The term "junction box" is used to include any box which will be attached to a support. For example, "junction box", "mounting box", "receptacle", "electrical box", "fixture box", "ceiling box", and the like are to be understood as synonymous terms, and not intended to be limiting.

Likewise, terms such as "left" and "right"0 and other relative terms are used to simplify the explanation of my invention and are not intended to be limiting.

OBJECTS AND SUMMARY OF THE INVENTION

Accordingly, it is an object of the invention to provide a junction box which overcomes the drawbacks and disadvantages of the prior art devices.

A further object of the invention is to provide a junction box suited for use on and in walls, floors, and ceilings, regardless of the location or configuration of the surface to which the junction box is attached.

Another object of the invention is to provide a junction box which can be inexpensively manufactured.

A still further object of the invention is to provide a junction box engineered so that large static and dynamic loads are transferred directly to the mounting surface on which the junction box is installed, as opposed to transferring forces to the junction box itself.

A further object of the invention is to provide a junction box suitable for use in new construction as well as for use in retrofitting.

Another object of the invention is to provide a junction box which is easier and faster to install and to use than conventional devices.

Yet a further object of the invention is to provide a junction box which can be temporarily attached, as well as permanently attached, to a variety of support surfaces.

A still further object of the invention is to provide a junction box suited for "single-handed" installation.

Another object of the invention is to provide a junction box which can be readily installed by one person.

Another object of the invention is to provide a junction box which is quicker to install than conventional devices.

It is a yet a still further object of the invention to provide a junction box which is easier for professionals as well as for lay people to install.

A further object of the invention is to provide a junction box which is easier to precisely locate and install than conventional devices.

Another object of the invention is to provide a junction box which has the means for temporarily adhering the junction box to a support surface that is provided as part of a junction box assembly.

Another object of the invention is to provide a junction box which can be readily installed by physically challenged people.

Another further object of the invention is to provide a junction box having means for temporarily securing the junction box to a surface, as well as means for permanently securing the junction box to the surface, both provided in a single assembly.

It is a still further object of the invention to provide a junction box having an adhesive thereon for adhering the junction box to a support.

In summary, therefore, the invention is directed to a junction box including a wall defining a junction box cavity therein, and means disposed on the wall for adhering the junction box to a support.

The invention will be further described with reference to the following drawings.

BRIEF DESCRIPTION OF THE DRAWINGS

FIG. 1 is a perspective view of a first preferred embodiment of a junction box according to the invention;

FIG. 2 is a sectional view of the junction box of FIG. 1, shown mounted on a support;

FIG. 3 is a portion of the junction box of FIG. 2, on an enlarged scale;

DETAILED DESCRIPTION OF THE INVENTION

Figure 6:
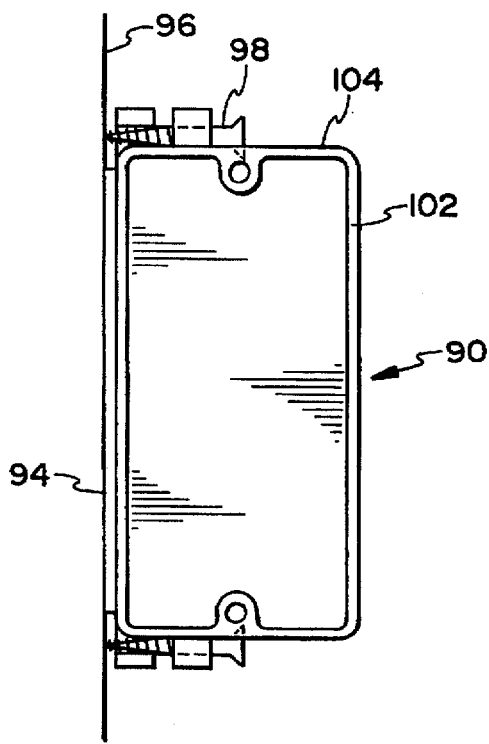
FIG. 6 is a sectional view of another preferred embodiment of a junction box according to the invention, shown in use.

Turning to FIGS. 1–3, a first preferred embodiment of a junction box 10 according to the invention will now be described.

Junction box 10 includes a junction box housing 14 having one or more walls 16 which define a junction box cavity 18.

A piece of tape 20 is provided on an upper surface 22 of junction box housing 14.

Good results have been achieved when tape 20 included a piece of double-sided tape 24 having a removable protective covering 28. Protective covering 28 is selected from a material which will not permanently adhere to an adhesive 32, so that protective covering 28 can be removed when junction box 10 is ready to be used. As will be readily appreciated, protective covering 28 keeps adhesive 32 free of dust and debris, and helps prevent unintended adhering of adhesive 32 to objects prior to use.

Junction box 10 is provided with one or more fastener holes 34 through which a permanent fastener 36 will be inserted for permanently affixing junction box 10 to a support 38, such as a joist or stud.

Junction box 10 may be provided with one or more fixture fasteners 44. Fixture fasteners 44 have a length, strength, and configuration selected to attach a fixture such as a chandelier or ceiling fan.

Figure 5:
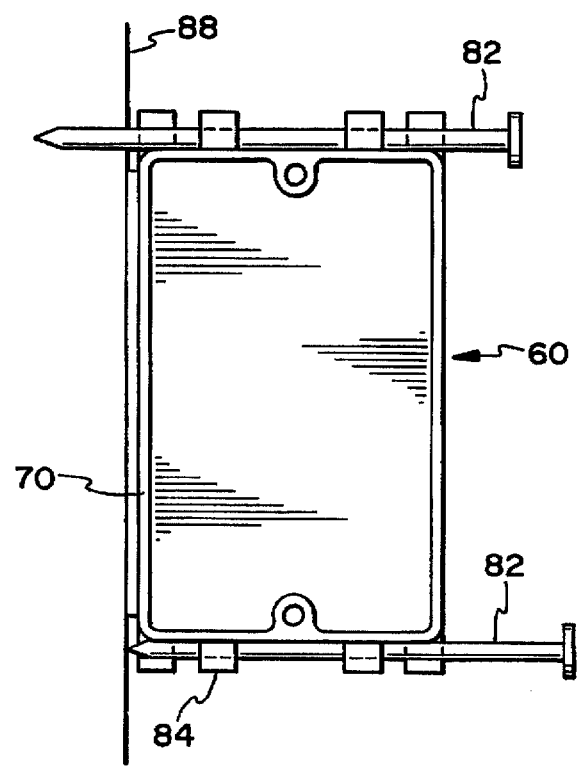
FIG. 5 is a sectional view of the junction box of FIG. 4, shown in use.
Figure 4:
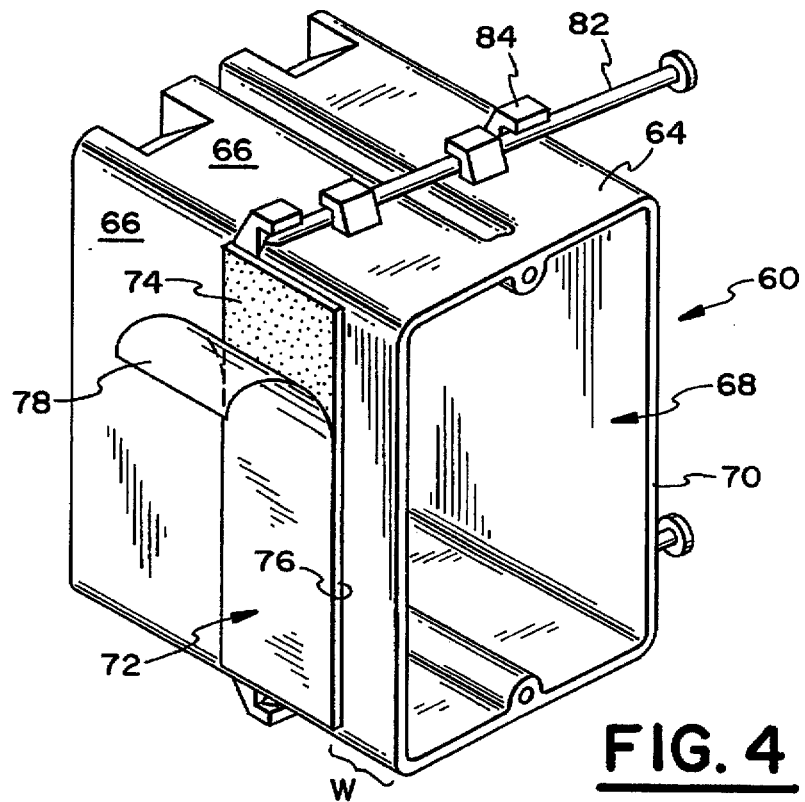
FIG. 4 is a perspective view of another preferred embodiment of the junction box according to the invention.

FIGS. 4 and 5 illustrate another preferred embodiment of a junction box 60 according to the invention.

Junction box 60 includes a junction box housing 64 having one or more walls 66 defining a junction box cavity 68 and a free edge 70.

An adhesive device 72, such as a piece of double-sided tape, includes an adhesive 74 on one or more faces thereof. Good results have been achieved when a double-sided tape 72 having a free edge 76 and being of the type having a protective covering 78 was used. Protective covering 78 maintains the adhesive qualities of adhesive 74 during storage and transportation, prior to use, as will be readily appreciated.

Preferably, one or more permanent fasteners 82 is provided on junction box 60.

In the embodiment of FIGS. 4 and 5, fastener 82 is a nail which extends transversely relative to tape 72 and is secured to junction box housing 64 by one or more grippers 84.

Good results have been achieved when free edge 76 of tape 72 is substantially aligned with free edge 70 of junction box housing 64. A width W of the gap defined between free edge 76 and free edge 70 may conveniently be sized so that the user can install junction box 60 at a correct spacing for a finished wall. surface. Thus, for example, in the case where junction box 60 is to serve as a receptacle installed in a wall constructed of standard ½-inch sheetrock (e.g., drywall or plasterboard), then width W will have a thickness of about 0.5 inches.

Turning to FIG. 6, a yet still further preferred embodiment of a junction box 90 according to the invention is shown.

Junction box 90 includes a piece of double-sided tape or other adhesive means 94 for temporarily adhering junction box 90 to a support 96.

One or more screws or permanent fastening means 98 are preferably provided on Junction box 90 for use in conjunction with tape 94. Screws 98 will have a size, length, and configuration dependent on the intended end use. Likewise, screws 98 may be angled relative to a free edge 102 of junction box 90 and/or angled relative to a corresponding wall 104 depending on the type of screw 98 used and the intended use of junction box 90.

Figure 7:
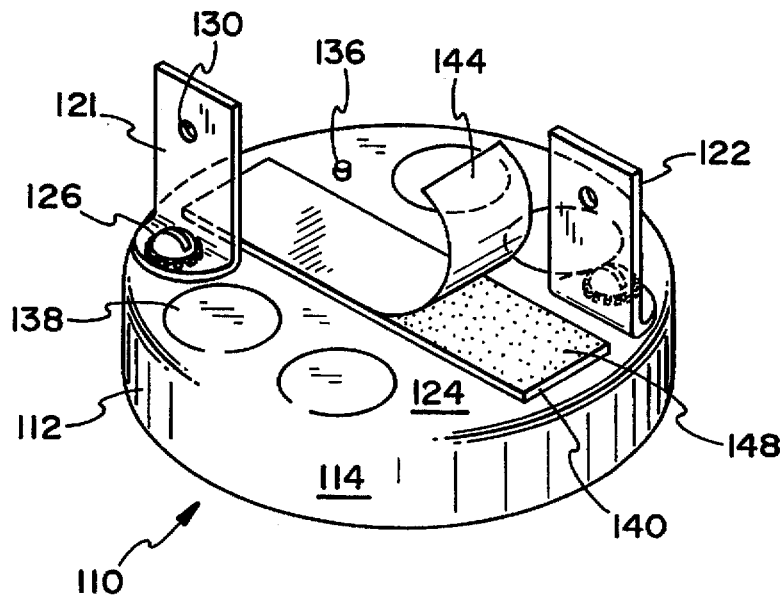
FIG. 7 is a perspective view of a still further preferred embodiment of a junction box according to the invention.
Figure 8:
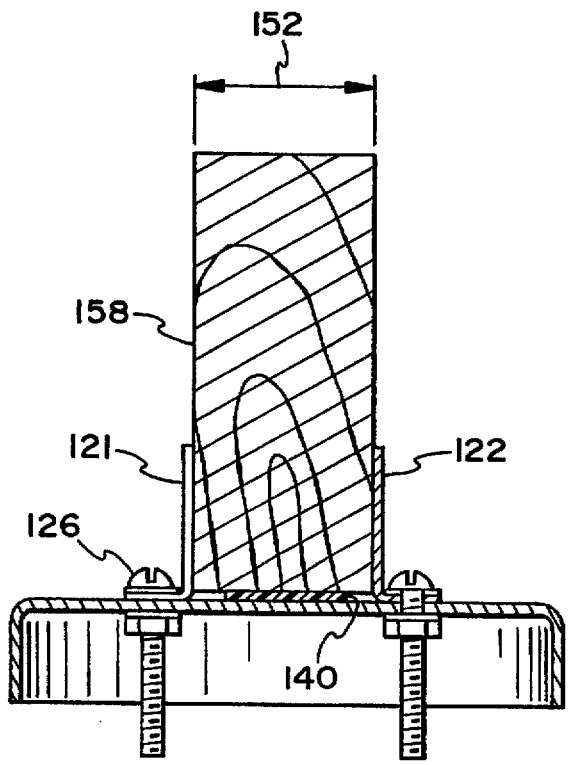
FIG. 8 is a sectional view of the junction box of FIG. 7, shown in use.

FIGS. 7 and 8 illustrate another preferred embodiment of a junction box 110 according to my invention.

Junction box 110 includes a junction box housing 112 having a wall 114 for defining a junction box cavity. There is provided a means for engaging opposite sides of a support member, such an irregularly shaped joist. Such engaging means includes a first mounting bracket 121 and a second mounting bracket 122 extending outwardly from an upper wall 124 of junction box 112.

Good results have been achieved when first and second mounting brackets 121, 122 were variably fixedly attached to upper wall 124 by fasteners 126, such as screws and locking washers. It is likewise contemplated that first and second mounting brackets 121, 122 will be more rigidly attached to junction box 112, such as by riveting, welding, or the like.

Each of first and second mounting brackets 121, 122 includes one or more holes 130 through which a fastener will be inserted for permanently mounting junction box 110 to a support member, such as a stud.

An electrical grounding connector 136, the free end of which is visible in FIG. 7, will typically be provided. Likewise, one or more removable plates or "knockouts" 138 will typically be provided in upper wall 124 of junction box housing 112.

Preferably, first and second mounting brackets 121, 122 are sufficiently small to both accommodate the removal of knockouts 138 and to provide room for inserting electrical wires, cables, and ROMEX™ connectors in the openings left by the removal of knockouts 138. In addition, the size of first and second mounting brackets 121, 122 will allow for junction box 110 to be attached to a wide variety of support members of varying width.

Adhesive or double-sided tape 140 is provided on upper wall. 124. A removable protective covering 144 protects adhesive 148 prior to use.

As will be readily appreciated, first mounting bracket 121 is offset from second mounting bracket 122 by a distance 152 selected to accommodate a support member 158 to which junction box 110 will be attached. Thus, where junction box 110 is to be attached to a conventional wooden 2"×4"0 stud having a nominal width of two inches, offset 152 will be about that nominal width of two inches more or less.

The provision of detachable fasteners 126 allows for the orientation of first and second mounting brackets 121, 122 to be adjusted, and for brackets 121, 122 to be removed, as desired.

OPERATION

The use of junction box 10 according to the embodiment of FIGS. 1–3 will be readily appreciated by first considering the fabrication of junction box 10, and then each one of FIGS. 1–3, in turn.

One may assemble junction box 10 by affixing a piece of double-sided tape 20 to upper surface 22 of junction box housing 14. As will be readily appreciated, tape 20 will preferably be located on upper surface 22 so as to not interfere with access to any of the other components such as fixture fastener 44.

Tape 20 may cover one or more permanent fastener holes 34 when tape 20 is of the type that is readily penetrated by a fastener such as a nail or screw. Good results have been achieved when an easily penetrable double-sided tape 20 was used. Likewise, good results have been achieved when double-sided tape 20 covers one or more permanent fastener holes 34, thereby serving as a guide to the user when attaching junction box 10 to support 38.

Thus, to affix junction box 10 to support 38, the user removes protective covering 28 and exposes adhesive 32.

In the case where support 38 is a stud, as illustrated, the user substantially aligns the longitudinal axis of tape 20 with the longitudinal axis of stud 38, as required.

Given that tape 20 covers three of permanent fastener holes 34, by aligning the longitudinal axis of tape 20 with the longitudinal axis of stud 38, the user has likewise located permanent fastener holes 34 in a desirable position relative to stud 38 so that the user simply inserts permanent fasteners 36 through one or more pre-aligned holes 34.

Given that tape 20 temporarily adheres junction box 10 to support 38, the user has both hands free in order to pick up and orient the desired permanent fastener 36. In other words, while junction box 10 is holding itself in place, as shown in FIG. 2, the user grabs a nail 36 for permanently fastening junction box 10 to support 38.

The user then inserts nail 36 into permanent fastener hole 34, and pounds nail 36 into support 38.

FIG. 3 illustrates permanent fastener 36 as it is being inserted into stud 38. Fastener 36 will typically be inserted into support 38 sufficiently far so that head of fastener 36 contacts the inside of junction box housing 14 for firmly pressing junction box 10 against support 38. One or more additional permanent fasteners 36 are attached in a similar manner.

A cover plate, electrical fixture, or the like can then be attached to fixture fasteners 44.

Good results have been achieved when double-sided tape 20 having a flexible, foam-like substrate having a thickness of about 1 mm was used. Such double-sided tape was sold under the name MANCO™ and distributed by Manco, Inc. of Westlake, Ohio. 44145. Such double-sided tape 20 was attached to a sixteen cubic inch electrical box suitable for fan and fixture support, UL™ listed 59E8, produced and distributed by Reiker Enterprises Inc. of Anniston, Ala. 36202.

An additional benefit flowing from the use of relatively thick, foam-like, double-sided tape is that the tape dampens the vibrations generated from electrical fixtures, such as ceiling fans, supported by junction box 10.

The embodiment of FIGS. 4 and 5 is produced and used in a manner similar to that of the embodiment of FIGS. 1–3.

The manufacturer attaches tape 72, or other adhesive material, to a wall 66 of junction box 60.

Good results have been achieved when free edge 76 of tape 72 substantially aligns with free edge 70 of housing 64. In addition, good results have been achieved when width W corresponds to the thickness of the finishing material. For example, when junction box 60 is attached to a stud of a wall on which ½-inch drywall is to be attached as the finishing material, width W will preferably be half an inch.

Thus, in use, the user removes protective covering 78, aligns free edge 76 with the outer free edge or face of support or stud 88, and presses exposed adhesive 74 against a face of stud 88 that extends transversely to the outer face thereof. Thus, at that stage of installation, free edge 70 of housing 64 will be located 0.5 inches outwardly of the outer face of stud 88. When ½-inch drywall is attached to stud 88, the outer face of the drywall will be substantially flush with free edge 70 of junction box 60, and junction box 60 will be ready to have a light switch inserted and a cover plate attached, for example. Before the drywall is attached to the outer face of stud 88, the user will typically have pounded permanent fasteners or nails 82 into stud 88. FIG. 5 illustrates tape 70 adhering junction box 60 to stud 88. The upper one of permanent fasteners 82 is shown partially inserted into stud 88, and the lower one of permanent fasteners 82 is shown free of engagement with stud 88 and ready to be inserted into stud 88.

The fabrication and use of the preferred embodiment of FIG. 6 is similar to that of the embodiment of FIGS. 4 and 5, except that the user will screw in screw 98, as opposed to pounding in nails 82.

The fabrication of the preferred embodiment of junction box 110 of FIGS. 7 and 8 is similar to the fabrication of the preferred embodiment of junction box 10 of FIG. 1.

In use, junction box 110 is installed by removing protective covering 144 from double-sided tape 140, thereby exposing adhesive 148. The spacing 152 between first mounting bracket 121 and second mounting bracket 122 allows for junction box 110 to be attached to a variety of widths of supports. In addition, the user can adjust the orientation of first and second mounting brackets 121, 122 by loosening and retightening fasteners 126. Adhesive 148 assists in holding junction box 110 temporarily place on the support while the user is adjusting the orientation of first and second mounting brackets 121, 122, as required, and then permanently attaching Junction box 110 to the support by use of permanent fasteners inserted through holes 130. Junction box 110 is particularly suited for being attached to opposite sides of a stud or ceiling joist.

Expected mounting surfaces include walls, ceilings, floors, studs, joists, plywood, and the like. Thus, any adhesive in addition to, or instead of, the illustrated double-sided tape may be used.

For example, a patch of glue, putty, or adhesive, such as a spray-on adhesive is expected to be used in addition to, or instead of adhesive tape.

Likewise, the junction box according to my invention will be made of various plastics, composite materials, stamped sheet metal, and the like depending on the intended use.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. An electrical receptacle, comprising:
   a) an electrical box;
   b) said electrical box including at least one wall defining a cavity therein;
   c) an adhesive provided on at least one of said at least one wall; and
   d) said adhesive being sufficiently strong to adhere said box to a support.

2. An electrical receptacle as defined in claim 1, wherein:
   a) said adhesive includes an adhesive tape.

3. An electrical receptacle as defined in claim 1, wherein:
   a) said adhesive includes a spray-on adhesive.

4. An electrical receptacle as defined in claim 1, wherein:
   a) said adhesive includes a double-sided tape.

5. A method of installing a junction box, including the steps of:
   a) providing a junction box housing;
   b) providing an adhesive on a portion of the junction box housing; and,
   c) pressing the adhesive on the junction box housing against a support surface for temporarily attaching the junction box housing to the support surface.

6. A method as defined in claim 5, further including the steps of:
   a) providing a fastener; and,
   b) permanently attaching the junction box housing to the support surface with the fastener.

7. A method as defined in claim 5, wherein:
   a) said step of providing an adhesive includes providing a piece of double-sided tape.

8. A method as defined in claim 5, wherein:
   a) said step of providing an adhesive includes spraying an adhesive onto said housing.

9. A method as defined in claim 5, wherein: p1 a) said step of providing an adhesive includes providing a piece of putty on said housing.

10. An electrical device mounting assembly, including:
    a) a box;
    b) said box including a wall defining a cavity therein;
    c) means provided on said box for temporarily affixing said box to a support surface; p1 d) said means for temporarily affixing said box including an adhesive; and
    e) means provided on said box for permanently affixing said box to the support surface.

11. A device as defined in claim 10, wherein: p1 a) said box includes metal.

12. An electrical device mounting assembly, including:
    a) a box; p1 b) said box including a wall defining a cavity therein;
    c) means provided on said box for temporarily affixing said box to a support surface; p1 d) said means for temporarily affixing said box including a tape; and
    e) means provided on said box for permanently affixing said box to the support surface.

13. A device as defined in claim 12, wherein:
    a) said box includes metal.

14. An electrical device mounting assembly, including:
    a) a box;
    b) said box including a wall defining a cavity therein;
    c) means provided on said box for temporarily affixing said box to a support surface;
    d) said means for temporarily affixing said box including a double-sided tape; and
    e) means provided on said box for permanently affixing said box to the support surface.

15. A device as defined in claim 14, wherein: p1 a) said double-sided tape includes a removable protective covering.

16. An electrical fixture mounting assembly, comprising:
    a) a junction box;
    b) said junction box including a wall defining a junction box cavity therein;
    c) means disposed on said wall for adhering said junction box to a joist; and p1 d) said adhering means including a piece of tape.

17. An electrical fixture mounting assembly as in claim 16, wherein: p1 a) said piece of tape includes a double-sided tape having adhesives on two sides thereof.

18. A device as defined in claim 16, wherein:
    a) said junction box includes metal.

19. An electrical fixture mounting assembly, comprising::
    a) a junction box;
    b) said junction box including a wall defining a junction box cavity therein;
    c) means disposed on said wall for adhering said junction box to a joist; and
    d) said adhering means including a spray-on adhesive.

20. A device as defined in claim 19, wherein:
    a) said junction box includes metal.

* * * * *